Nov. 25, 1969   B. S. APPLETON   3,479,893
TRANSMISSION BELT

Filed Jan. 23, 1968   4 Sheets-Sheet 1

Inventor
BERNARD S. APPLETON

By Edward Halle
Attorney

Nov. 25, 1969   B. S. APPLETON   3,479,893
TRANSMISSION BELT

Filed Jan. 23, 1968   4 Sheets-Sheet 2

INVENTOR.
BERNARD S. APPLETON
BY Edward Wells
ATTORNEY.

*INVENTOR.*
BERNARD S. APPLETON
BY Edward Halle
*ATTORNEY.*

United States Patent Office 3,479,893
Patented Nov. 25, 1969

3,479,893
TRANSMISSION BELT
Bernard S. Appleton, 926 Midway,
Woodmere, N.Y. 11598
Continuation-in-part of application Ser. No. 566,960,
July 21, 1966. This application Jan. 23, 1968, Ser.
No. 699,970
Int. Cl. F16g 1/24, 13/08
U.S. Cl. 74—235
47 Claims

ABSTRACT OF THE DISCLOSURE

This invention relates to flexible transmission belts adapted for use with standard sprocket wheel means. The transmission belts comprise transmission pin means with, or without rollers, adapted to match the root area between standard sprocket teeth, said means having a diameter substantially equal to twice the radius of the root of the sprocket, and being held together serially by an elongated flexible body construction such as cable made of wire, cord, fabric, or other suitable material, so as to register said transmission means with said roots of said sprocket means; thereby providing a transmission belt which matches the sprocket means positively, without lost motion, which applies the direction of transmission of force along the pitch line of the sprocket teeth smoothly. The invention also provides forms of transmission belts having non-metallic or metallic cylindrical transmission pins which will fit all standard sprocket wheels and thereby obviate the necessity of providing special sprockets for use in combination therewith, and which will fit all existing sprocket mechanism installations without alteration; and the invention provides for various forms of connectors to connect belt ends together and provide transmission means at such connection points with proper relationship to the other transmission means of the belt or belts. The invention also contemplates a new type of connection between transmission pin and the body portion of the belt as well as methods for making such connection.

---

This application is a continuation-in-part application of my prior filed application for Transmission Belt, filed July 21, 1966, Ser. No. 566,960.

The invention is illustrated in the accompanying drawings in which:

FIG. 24 is an elevational view of link 470 shown in FIG. 23;

Similar numerals refer to similar parts throughout the several views.

Figures 1, 2, 3, 4, 5, 6, 7, 8:
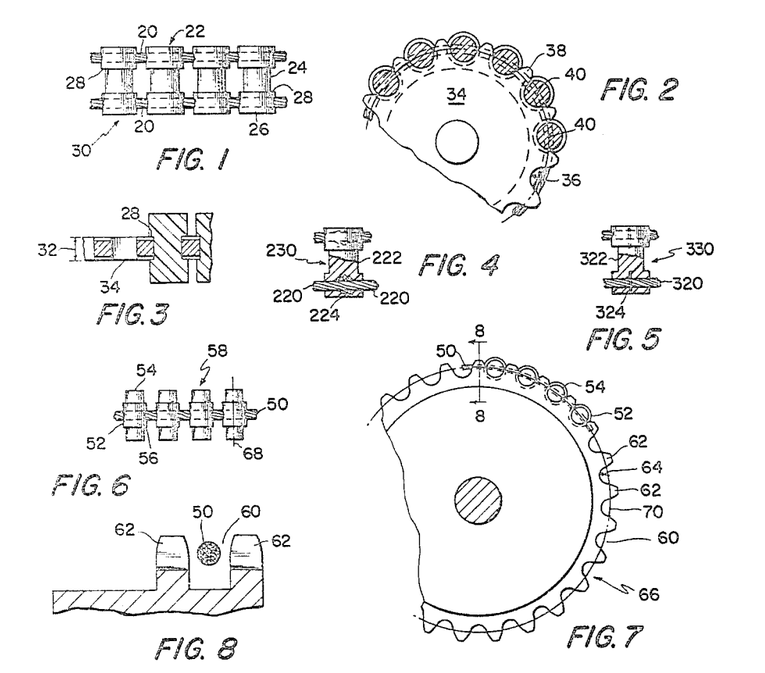
FIG. 1 is a top plan view of a length of transmission belt made in accordance with the first form of the invention.
FIG. 2 is a side elevation partly in section with portions cut away.
FIG. 3 is a top plan view of the view shown in FIG. 2 with portions cut away.
FIG. 4 is a top plan view of a portion of a transmission belt with portions in section showing internal construction.
FIG. 5 is a view similar to FIG. 4 showing another form of internal construction.
FIG. 6 is a top plan view similar to FIG. 1 showing a second form of the invention.
FIG. 7 is a view similar to FIG. 2 showing another form of the invention.
FIG. 8 is a sectional view along the lines 8—8 in FIG. 7.

In the first form of invention illustrated in FIGS. 1 through 3 of the drawings, I provide a transmission belt 30 having a plurality of flexible spaced elongated body portion elements 20. In this case there are a pair of elements 20, preferably made of steel cable such as braided wire, or any other suitable material. The elongated flexible body portion elements 20 carry a series of other elements transverse to elements 20 which are in the form of a body portion 22 for the formation of the cylindrical transmission pin means 24. Each pin means body portion 22 is made of a non-metallic low friction material. I prefer to use a polyamide or a polycarbonate.

The pin body portions 22 comprise end portions 26 through which the elongated body portion elements 20 are transfixed, affixed or fastened. Between each pair of end portions 26 there is a reduced cylindrical portion 24 which comprises a cylindrical transmission pin of the invention. The reduced cylindrical portion 24 is separated from end portions 26 by shoulders 28. Since the transmission belt 30 of the invention is made for use with standard sprocket wheels, I provide that shoulders 28 are substantially the same distance apart as the width of the sprocket face, indicated at reference numeral 32, of any given standard sprocket wheel 34.

Further, in order to carry out the invention, I provide that the diameter of each cylindrical pin means 24 is substantially equal to twice the radius of the root 36 of the sprocket of the standard sprocket wheel for which it it adapted. By placing elongated body elements 20 across end portion 26 in a position substantially perpendicular to the axis of transmission pin 24, the force of pull of the transmission belt 30 will automatically be at pitch line 38 of the sprocket 34. This is because each transmission pin 24 with its axis 40 will be at the center of each root of the sprocket 34. Thus, I provide a transmission belt producing a positive drive. The body portion 22 for the transmission pin 24 is affixed to the elongated flexible body portions 20 of the transmission belt 30 by means of molding the plastic material of the body portion 22 around the elongated flexible body portion 20; or by mechanical bonding, or any adhesive method, or by placing a mechanical obstruction at or through the flexible elongated body portion 20 and by then molding the plastic material around the obstruction.

I illustrate two methods of doing this in FIGS. 4 and 5 of the drawings. In FIG. 4, a portion 224 of the wire strand of a cable 220 has been cut and turned inwardly on both sides of a belt such as belt 230. A body portion is molded in position around the torn portions by means of molding a plastic material such as material 222 which will then cover the torn portions 224 on both sides of the belt 230. Thus, the plastic material 222 will be embedded around both the cable 220 and the obstruction 224 and be prevented from being displaced.

Another method is illustrated in FIG. 5 of the drawings in which a pin 324 or other means is inserted through cable 320 on each side of a belt 330. Plastic material such as plastic 322 is then molded around the cable 320 and the obstruction material 324. These two forms of construction are shown. There are many forms which can be made to accomplish the manufacture of the cable with transmission pins which are non-displaceable.

It is contemplated that for each standard sprocket wheel, a transmission belt having cylindrical transmission pins of a matching size will be made. Thus, a particular standard size belt will be made for each particular standard size sprocket. The size of the sprocket is determined by the pitch and the face measurement. I need not go into all of the standard sizes of sprockets as these as well known in the art. It is sufficient to say that a transmission belt made in accordance with my invention as described hereinabove may be made in particular measurements to fit the pitch and face measurement of any standard sprocket.

In a second form of invention shown in FIGS. 6 through 8 of the drawings, the transmission belt is a single strand flexible elongated body portion 50 preferably made of steel cable such as braided wire or any other suitable material, and a series of transmission pin body portions 52 preferably made of plastic and molded around the cable 50 in the same manner as body portions 22 are connected to body portions 20. Transmission pin body portion 52 has a pair of cylindrical transmission pin portions 54 extending laterally from a pair of shoulders 56 in body portion 52. This form of the invention is adapted to be used with a standard rotary sprocket wheel having a pair of sets of laterally spaced teeth so that the elongated body portion 50 of the transmission belt 58 can ride in the space 60 between each set of teeth 62, and the laterally extending transmission pins 54 will be serially seated at the center of successive roots 64 between teeth 62 of twin sprocket wheel 66. Here again, each cylindrical transmission pin element 54 has a diameter equal to twice the radius of root 64 of standard twin sprocket 66, and here again, the elongated body portion 50, being perpendicular to and bisecting each axis 68 of each cylindrical transmission pin portion 54, will be automatically at the pitch line 70 of both sets of teeth 62 of the sprocket 66, placing the force of pull of the belt 58 on the pitch line 70.

Figure 9:
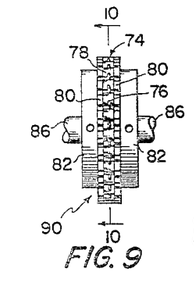
FIG. 9 is an elevational view showing another form of the invention.
Figure 10:
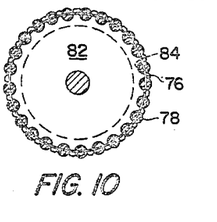
FIG. 10 is a sectional view taken along the lines 10—10 in FIG. 9.

In a third form of the invention shown in FIGS. 9 and 10 of the drawings. I use a single strand transmission belt made in accordance with the second form of the invention as a component part for a universal drive. This is done by providing a single strand transmission belt 74 with a continuous elongated circular body portion 76 comprising cylindrical transmission pin body portions 78, each having laterally extending cylindrical transmission pin elements 80. The elongated body portion 76 is made into a circular continuous body portion by any method known to the art. I prefer to select one of the body portions 78 as a linking unit, placing both ends of body portion 76 in it, either by molding or by mechanical bonding, and then molding the body portion 78 at the joint over the bond. The transmission belt 74 is made with extended transmission pin elements 80 adapted to fit into a standard sprocket wheel such as wheel 82. There are an equivalent number of cylindrical pin portions on each side of belt 74 to match the number of roots 84 in sprocket wheel 82. A pair of sprocket wheels 82 are independently mounted on a pair of shafts 86 in spaced axial alignment. One of the wheels 82 is moved laterally along its shaft 86 to create spacing between it and the other wheel 82. The continuous belt 74 is then placed on one of the wheels by slipping it between the two shafts 86 and fitting it circumferentially around wheel 82. Then the other wheel 82 is moved laterally again toward the wheel fitted with belt 74 and a press fit is made so that the belt is now fitted to both sprocket wheels 82. Both wheels are then fastened securely to the ends of their respective shafts 86, and the universal joint 90 is set up. Application of power to either of the shafts 86 will cause it to rotate, rotating its sprocket wheel 82, rotating belt 74, and in turn causing other sprocket wheel 82 to rotate together with its shaft 86. Thus, a universal joint 90 has been set up which permits some angular variation in the alignment of shafts 86 and which will permit power to be transmitted from one shaft to the other while angularly displaced.

Figure 11:
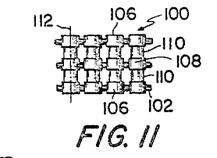
FIG. 11 is a top plan view of another form of the invention.
Figure 12:
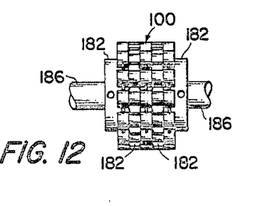
FIG. 12 is an elevational view of the form of invention shown in FIG. 11 in combination with other elements.

A fourth form of the invention is another universal joint illustrated in FIGS. 11 and 12 of the drawings. This form of invention is set up in exactly the same way as the third form of invention, the difference being in the form of the transmission belt. Transmission belt 100 of the fourth form of invention is a triple strand belt having three elongated continuous body portion elements 102 comprising the body portion of the belt. The transmissin pin body portions 104 comprise a pair of end sections 106, a center section 108 and a pair of cylindrical transmission pin sections 110 separating the center section 108 from the end sections 106. The transmission pin sections 110 are aligned on the same central axis 112, and the elongated continuous body portion elements 102 are perpendicular to and bisect each axis 112 of each body portion 104. Each pin section 112 is substantially as long as the width of face of a sprocket wheel 182 with which it is adapted to be associated and meshed. Sprocket wheels 182 are associated with shafts 186 in the same manner as sprocket wheels 82 are associated with shafts 86 in the third form of the invention, and belt 100 is installed as a component of the universal joint 120 in the same manner. Here again, cylindrical transmission pin portions 110 are designed with a diameter of twice the radius of the roots of sprocket wheels 182 with which they will be meshed. When the components are set up as shown in FIG. 12 of the drawings, a useful universal joint is provided.

Elongated body portions 102 are made endless and continuous by providing linking means in the same manner as that shown in the third form of the invention. In both the third and fourth form of the invention, in the preferred forms as illustrated, there should be a cylindrical transmission pin either 80 or 110 for each sprocket wheel root. However, the endless continuous belts such as 74 or 100 may be made with a cylindrical transmission pin provided for every other sprocket root or every third or fourth sprocket root, it being understood that the efficiency of the belt for universal joint purposes will be diminished, while still useful in some installations, in those forms of the invention where sprocket roots may be skipped.

Figures 13, 14, 17, 18, 19:
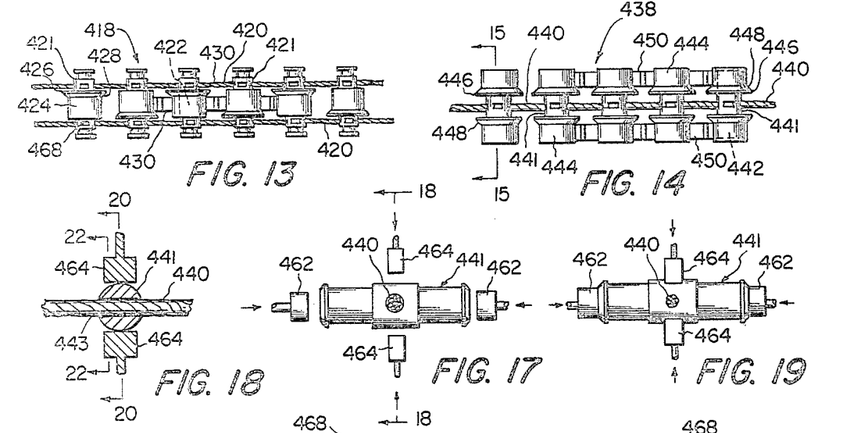
FIG. 13 is a top plan view of another form of the invention.
FIG. 14 is a top plan view of another form of the invention.
FIG. 17 is an elevational view of a pin 441 in position between punches 462 and 464 prior to pressing the material of the pin around the cable, it being understood that the punches are representative of punches in a punch press with the main body portion of the press being cut away.
FIG. 18 is a sectional view along the lines 18—18 of FIG. 17 with punches 464 at a starting point of their press against the pin 441.
FIG. 19 is a view similar to FIG. 17 with punches 462 and 464 at the end of their punch stroke showing the material of pin 441 flowed around cable 440.

A fifth form of invention is shown in FIG. 13 of the drawings in the form of a transmission chain or belt 418 having a plurality of flexible spaced elongated body portion elements 420 preferably made of steel cable such as braided wire. These elongated flexible body portion elements 420 carry a series of transmission pin means 421 comprising axle means 422 on which are mounted transmission roller means 424. Each transmission roller means 424 has at least one flange means 426 having an inner bevelled edge 428. This will locate the roller 424 on the transmission pin 421 laterally with reference to the sprocket tooth 430.

On old chains of the prior art, the side links were the locaters. With the chain or cable of the invention, the flange 426 is the locater, and its bevel 428 provides a funnelling effect as the roller 424 approaches the tooth 430 and settles between the teeth 430. The flanged bevelled edge of the roller funnels the chain or cable into the exact lateral position with respect to the sprocket teeth 430. With the old steel chain of the prior art, the side locaters or links were rigid, and would have a friction effect coming against the teeth. With the new belt 418 of the invention, as the cable approaches the teeth, the flange 426 on the roller 424 rolls down while it locates itself and minimizes friction in a non-rigid rolling arrangement. The flange 426 as well as the bevel 428 may be applied to all rollers for all forms of the invention set forth herein.

I prefer to make the rollers 424 out of polyurethane. This type of material works well as a roller of a steel axle or pin, and also presents reduced friction when meshing into sprockets. I may also use steel rollers 424 especially when the sprockets may be made of a plastic material, or steel on steel or plastic on plastic.

In FIG. 14 there is another form of transmission belt 438 having a flexible cable 440, transmission pins 441 and axles 442 and transmission roller means 444 and flanges 446 with bevelled sides 448. Cable 438 is adapted for use with double sprocket wheels having sprockets as indicated by reference numerals 450. Here again, the flanges 446 and the bevelled edges 448 act to align the cable in the same manner as flanges 426 described hereinabove.

The single strand type of cable 438 is admirably adapted for flexible installations to connect two sprockets having non-parallel axles. The flexibility of the cable 438 permits the transverse transmission pins 441 a certain leeway of rotation about the axis of cable 438 since the cable may be twisted to a certain degree during operation. In addition, the cable may be flexed an any direction permitting the rollers 444 to describe all sorts of curves during their cycle of operation. The cable 438 may, therefore, be attached to a sprocket in a horizontal plane and also to a sprocket in a vertical plane without loss of transmission ability by reason of undue friction. In addition, because of the non-rigidity of the chain or cable of the invention, this flexible drive may be affected which would otherwise be impossible in a rigid chain of the prior art.

Figures 15, 16:
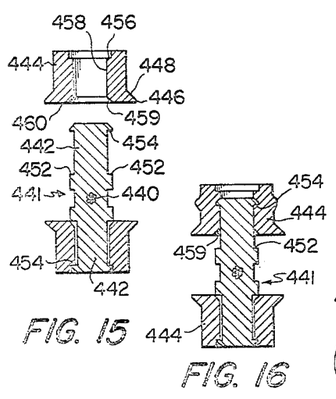
FIG. 15 is a sectional view along the lines 15—15 of FIG. 14 with some parts in exploded position.
FIG. 16 is a view similar to FIG. 15 with the part in exploded position now in partially assembled position.

I refer now to FIGS. 15 and 16 of the drawings to show details of construction of the cable transmission belt 438. The transmission pin 441 has two pairs of shoulders, each comprising an inner shoulder 452 and an outer shoulder 454. The rollers 444 are fitted to the pins 441 by being provided with an annular shoulder 456, within the roller core 458, adapted to ride against axle shoulder 454 with inner end 460 of roller 444 adapted to ride against inner shoulder 452 of axle 442. The width of roller 444 and the positioning of the annular shoulder 456 is such that the roller 444 will ride on axle 442 in fairly close tolerance. The plastic, such as polyurethane, of the roller 444 is such that the roller is adapted to be pulled over shoulder 454 of the axle as shown in FIG. 16 until it is set in place as shown in FIG. 15. Thus, rollers 444 may be made of a deformable material for assembly and replacement and for purposes of attaching chain or cable connectors and other accessories. This feature of assembly and replacement is assisted by providing a chamfered end 459 to the roller bore so that the roller 444 may be deformed and pushed more easily over outer shoulder 454 as shown in FIGS. 15 and 16 of the drawings. The method of re-assembling will generally apply when belts are to be connected together in a continuous endless loop, or to one another, or connected to accessories in the various manners and forms as set forth hereinbelow.

Constructions made in accordance with this invention can be run at speeds up to ten times the rated speed of sprocket chain of the prior art without lubrication. Another advantage of this construction is that it will outwear ordinary sprocket chain, will hold together longer at high speeds, is silent, and can be used on smaller sprockets than the prior art sprocket chain at high speeds.

It is apparent that the transmission belts of the invention are much more versatile than the sprocket chains of the prior art, and their versatility and flexibility can be further enhanced by eliminating some of the bevelled flanges such as flanges 426 and 446. Reference to FIG. 13 of the drawings will show that the flanges 426 are alternated on either side of the series of rollers 424. A belt such as belt 418 can be made with the flanges on both sides of each roller, or alternated as shown, or skipping flanges on one or more rollers between flanged rollers. The same would be true for a belt such as belt 438 as illustrated in FIG. 14 of the drawings. This belt 438 is shown having a single flange on each roller adjacent the inner shoulder 452 of each pin 441. (See FIG. 15.) On such a belt, flanges 446 could be eliminated between rollers, and the flanges could be alternated from side to side and placed on selected rollers 444. Is is, therefore, intended in this specification and in the claims hereinbelow that the term "selected rollers" shall mean rollers in one or more aligned series in a transmission belt having the flanges of the invention.

A principal problem in connection with flexible cables has been the manner and means of securing the components together. For example, the transmission pins or axles for this type of cable must have the fluidity of flexibility in connection with the cables, and must also be connected to the cables in such a manner that there will be no shifting so that the pins may maintain a proper relationship with one another to fit the sprockets properly.

I have found that the use of a twisted wire cable having several main strands of wire with each main strand having several smaller strands of wire is suitable for the cable such as cable 420 or 440 as shown in FIGS. 13 and 14 of the drawings. I then select transmission pins of a material such as steel (or plastic) which may be flowed under pressure around the cable 440 as illustrated in FIGS. 17 to 22 of the drawings. I use the following method. I take a cable, for example, a 7 x 19 cable having 7 main strands, each of the 7 main strands having 19 smaller strands as illustrated by reference numeral 440 in the drawings. The cable of the invention may be a twisted wire cable as described of any number of strands. The number of strands selected as being 7 x 19 is for purposes of illustration only of a preferred form of the invention. In addition, any cord or other elongated flexible element of sufficient strength for the intended use of the belt may be used instead of a steel or wire cable. The cable 440 is pre-stretched by applying a tensile strength to it of about 60 to 70% of its rated strength. This is for the purpose of placing the cable under stress so that when the pins are clinched on, they will be in effect in proper position on a transmission belt made of the cable, which will not be further stretched when placed under tension in an operating situation. This is somewhat similar to pre-shrinking cloth before cutting it and manufacturing it into a garment.

Figure 20:
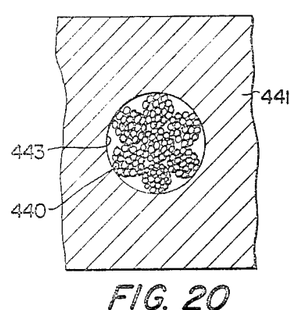
FIG. 20 is an enlarged section along the lines 20—20 of FIG. 18 with parts cut away.
Figure 21:
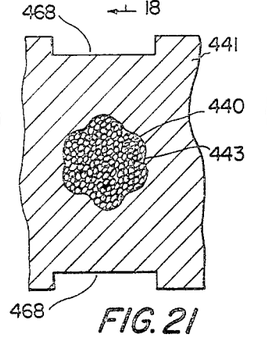
FIG. 21 is a view similar to FIG. 20 except that it shows the parts after the punches have flowed the material of pin 441 around cable 440.
Figure 22:
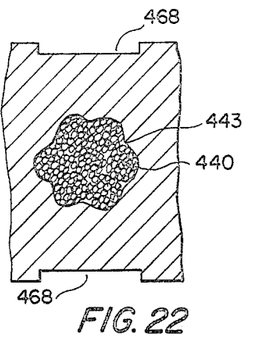
FIG. 22 is a view similar to FIG. 21 except that the section is taken from a position as indicated at lines 22—22 in FIG. 18 to show a further section indicating the twist in the cable 440 and the configuration of the material flow around the twist in the cable.

Let us say that the diameter of my 7 x 19 cable is .066 of an inch. I then select a steel transmisison pin such as pin 441 having an opening 443 with an internal diameter of .070 of an inch. The cable 440 is inserted through the opening 443 (after stretching the cable) as shown in FIG. 17 of the drawings. In FIG. 18, I show another view of the cable 440 in the pin 441 being held in a position on a press, with punches 462 about to apply edge pressure and punches 464 about to apply clinching pressure. In the preferred method, I first provide for punches 462 to hold the pin in position, and then simultaneously apply pressure from punches 464 and punches 462 as shown in FIG. 19 of the drawings. Thus, punches or dies 462 would apply sufficient pressure to reduce the diameter of the opening 443 on horizontal centers to .060 of an inch while the clinching dies or punches 464 would reduce the vertical diameter of the opening by flowing the metal of the pin 441 under pressure. The result would be an opening in the pin of a smaller diameter than the original diameter of the cable 440, and the internal configuration of the opening of the pin would have a spiral effect which fit around the twists of the cable in such a manner as to provide a mechanical interference to the cable being dislodged from the pin or from the pin becoming dislodged from the cable. This is further illustrated in the enlarged cross sectional drawings 20, 21 and 22. In FIG. 20, we see the details just prior to the exertion of pressure by the punches. In FIG. 21, we see the result after the pressure is applied and the pin 441 is affixed to the cable 440. We may note in FIG. 21 that there is now a relatively large depressed portion 468 on both sides of the cylinder of the pin 441. This is where presses 464 have pressed the material of the pin inwardly to flow around the cable. In FIG. 22, another section is taken a small distance away from the section of FIG. 21 to illustrate the twist of the cable within the pin, and the resulting section of the configuration of the opening 443 resulting in the pin.

Since it is impractical to move more than about 10% of the material in a metal piece without creating metal fatigue, it is desirable to either push a piece of metal with a bald punch or to use a flat punch against a rounded section of metal. In the application of these principles to the invention, we find a flat punch as punchers 464 placed against the rounded section of pin 441 as best illustrated in FIG. 17. Pressed sections 468 may also be seen in the other figures of the drawings, such as in FIGS. 13 and 14.

While a preferred form of the invention has been illustrated with braided wire cable and steel pins, the components of the belt may be constructed of any suitable materials. In addition, the method of affixing the pins of the invention may be applied to any transmission pin material, whether metal or plastic, which has the property of flow under pressure or heat, and the further property of maintaining its deformed condition or mass after the pressure or heat is removed so that any number of such materials may be utilized for both the method and construction of the invention.

Figure 23:
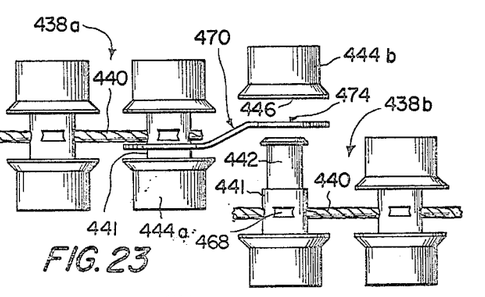
FIG. 23 is a top plan view of a form of linking arrangement for the invention with parts in exploded position.

I also provide belt connector means for all forms of the invention. For example, in FIGS. 23 and 24, I show a belt connector means in the form of a link 470 which is adapted to connect two ends of a single cable belt such as belt 438 so that it can be made into a continuous endless belt. Link 470 can also be used to connect the ends of two separate belts to increase the length of a belt. Link 470 has openings 472 and 474. Opening 472 is placed over an end transmission pin 441 at belt end 438a, and opening 474 is placed over a portion of another end transmission pin 441 at belt end 438b as shown in FIG. 23. As has been described hereinabove, rollers 444 were removed from the two pins 441 on which link 470 is being installed in FIG. 23. On the left belt end 438a, opening 472 has been placed over pin 441 and a new roller 444a has been pushed over the axle portion of pin 441 installing the end of the link 470. In the right hand belt end 438b of FIG. 23, we see the other end of link 470 with opening 474 about to be placed over the axle 442 of the other end pin 441. When this is done, roller 444b is then placed over the axle 442 to complete the connection. Link 470 is offset so that one opening 472 can be on one side of the cable 440, and opening 474 can be on the other side of cable 440. This is done to balance the connection and keep the cable on a true path without lateral displacement.

Figures 36, 37, 38, 39, 40:
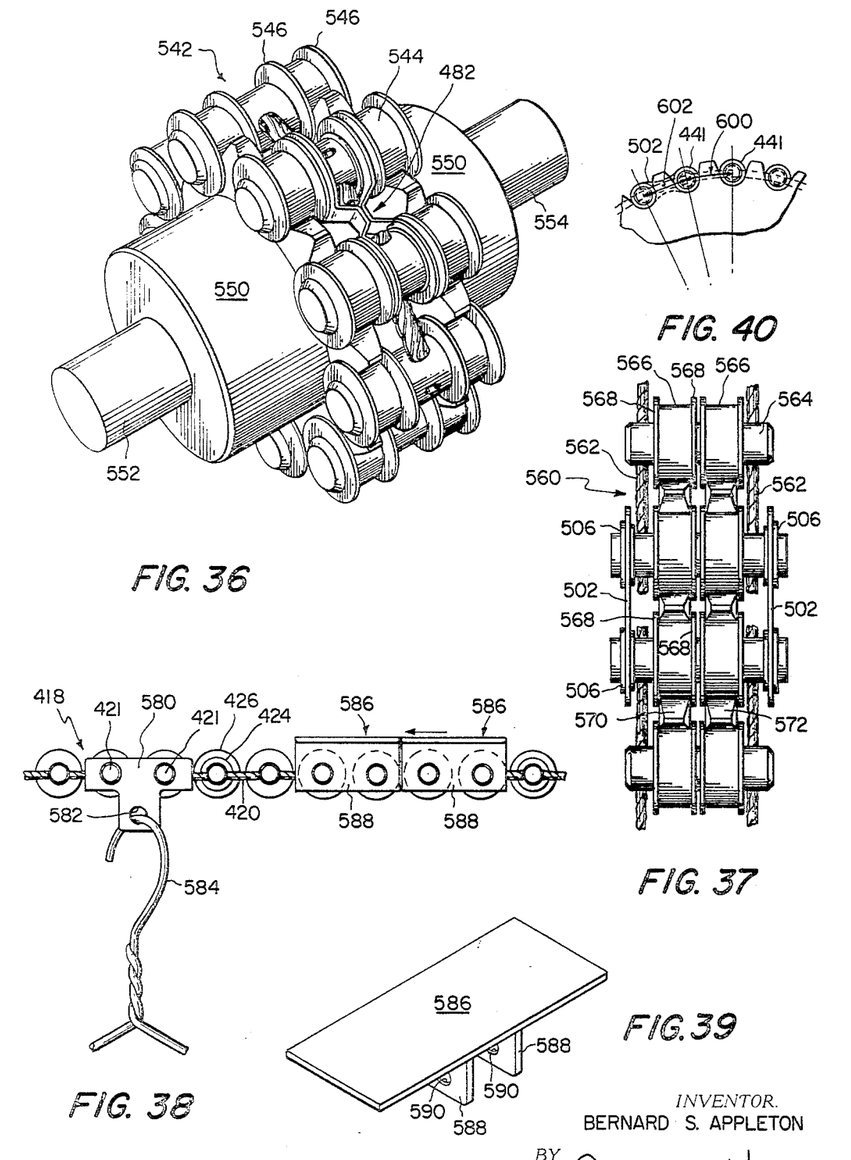
FIG. 36 is a perspective view of another form of the invention.
FIG. 37 is an elevational view of another form of the invention with parts cut away.
FIG. 38 is an elevational view of a form of the invention comprising accessory means with parts cut away and parts in phantom.
FIG. 39 is a perspective view of a platform 586 as shown in FIG. 38.
FIG. 40 is a portion of a sprocket shown in side elevation to illustrate the difference in pitch lines between the flexible portions of the transmission belt and the rigid linking means therefor.

Since the link 470 is a solid link and does not curve around the pitch line in the same manner as a flexible cable as illustrated in FIG. 2 hereinabove, the distance between the centers of the openings 472 and 474 (see reference numeral 480 in FIG. 24) should be calculated to provide a shorter pitch than the curved pitch of the cable. This is illustrated in FIG. 40 of the drawings. The normal pitch between transmission pins 441 when attached by flexible cable is shown as the curve 600. The straight pitch line between transmission pins 441 held by link 502 is shown as the straight line 602 which is similar to line 480 drawn between the centers of the openings in a link as shown in FIG. 24.

Figures 25, 26, 27, 28, 29, 33, 35:
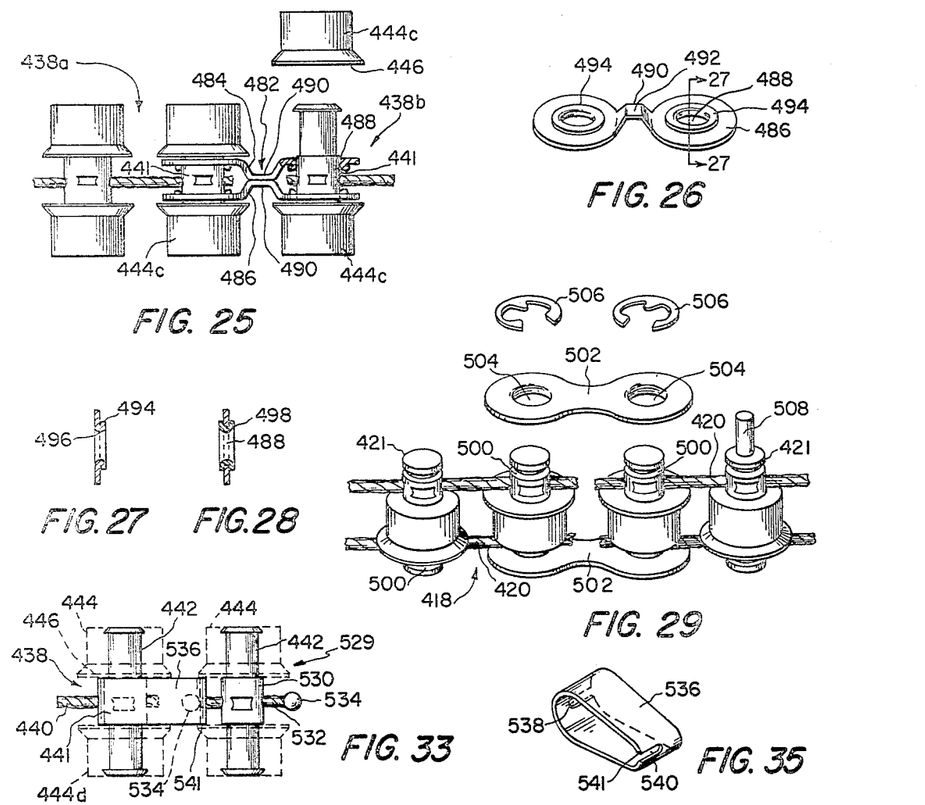
FIG. 25 is a top plan view of another form of linking arrangement.
FIG. 26 is a perspective view of a link portion 486 of FIG. 25.
FIG. 27 is a sectional view along the lines 27—27 of FIG. 26.
FIG. 28 is a sectional view similar to FIG. 27 showing a different form of construction.
FIG. 29 is a perspective view of another form of linking arrangement for the invention.
FIG. 33 is a top plan view of another form of linking means with parts shown in phantom.
FIG. 35 is a perspective view of a portion of the linking means shown in FIGS. 33 and 34.

In FIG. 25, I show another form of belt connector means 482 which comprises a pair of links 484 and 486. These links 484 and 486 are made of spring tempered steel having end openings 488 adapted to fit over the centers of end pins 441 of belt ends 438a and 438b as shown in FIG. 25 of the drawings. Links 484 and 486 are installed in the same manner as link 470 by removing rollers 444 and by placing new rollers such as rollers 444c over the pins 441 to hold the links in place. It can be seen that the sides of the flanges 446 are adapted to hold links 484 and 486 (as shown in FIG. 25) as well as link 470 (as shown in FIG. 23) securely in place. Each link 484 and 486 comprises a bent central portion 490 having a reduced cross section area 492. This is done to provide for further flexibility of the link arrangement 482. Here again, the centers of the openings such as openings 488 should be shorter in pitch than the pitch line formed by the flexible cable (as illustrated in FIG. 40) for the reasons set forth hereinabove.

In link 486 illustrated in FIG. 26, I show a radius rim 494 around openings 488. This is particularly illustrated in FIG. 27 of the drawings. The inside 496 of the radius rim 494 provides a curved bearing making a smoother link connection and greater flexibility.

An alternate form of bearing is shown in FIG. 28 where I show an opening such as opening 488 with a plastic eyelet 498 fitted inside the opening. The plastic eyelet 498 also provides a curved radius bearing which has the same effect as the radius 494. Radius bearing such as 494 or 498 may be supplied with any link opening illustrated herein, or with any link having openings devised for use with the invention.

In FIG. 29 of the drawings, I show an exploded perspective of another form of belt connector means which is particularly adapted for use with a plural strand belt such as belt 418. Selected transmission pins 421 on belt 418 may be provided with annular grooves 500 at their ends. Links 502 having openings 504 are placed over the ends of the pins 421 so that the openings 504 will fit over the pins, and fastening means 506 in the form of spring detents which fit into the grooves 500 hold the links 502 in place. Here again, the centers of openings 504 in links 502 are provided with a shorter straight pitch line than the normally curved pitch line of the cables 420 for the reasons set forth hereinabove.

Further reference to FIG. 29 will show a lateral extension 508 on one of the pins 421. This lateral extension may be used to actuate a switching mechanism or other device each time pin 421 with lateral extension 508 passes a station containing such switching device or other mechanism. The manner of actuating such devices is well known in the art, and need not be explained further other than to say that the lateral extension or pin 508 will move some part of the mechanism of the switch or other device as the belt with pin 508 passes such switch or other device.

Figures 30, 31, 34:
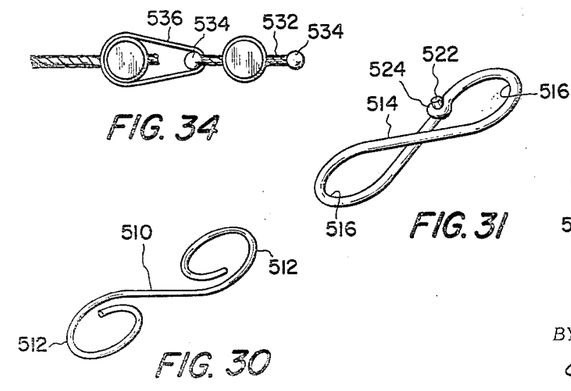
FIGS. 30, 31 and 32 are perspective views of three forms of linking means used in connection with the invention.
FIG. 34 is an elevational view of the linking means shown in FIG. 33.
Figure 32:
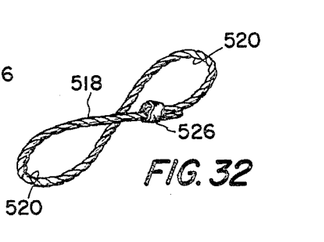

In FIGS. 30, 31 and 32, I show other forms of belt connector means. In FIG. 30, I show a belt connector means 510 made of spring wire having a pair of curled ends 512. Curled ends 512 are adapted to be curled around end transmission pins such as end pins 441 shown in FIG. 23 of the drawings. The curled ends 512 would be in the same position on pins 441 as the openings 472 and 474 of link such as link 470.

In FIG. 31, a substantially similar connector link is shown in the form of a figure eight of wire 514 having bights 516 which would be curved around pins 441 in a manner similar to the openings 472 and 474 of link 470 as illustrated in FIG. 23, and in FIG. 32 a similar formation made of a braided wire 518 having bights 520 could be used as a belt connector means in the same way. Belt connector means 514 may be provided with a hook 522 and eyelet 524 arrangement as an installation means, and belt connector means 518 may be provided with a band connector 526 pressed around the ends of the braided wire to complete the figure eight.

In FIGS. 33, 34 and 35, I show another form of belt connector means for a single cable belt such as belt 438. In this form of belt connector means, I provide one or more connector link transmission pins 530. The connector link transmission pins are identical to the pins 441, and are provided with axles 442 and rollers 444 in the same manner. They are placed, however, on short lengths of cable such as cable 532, each length of cable having a ball 534 at an end thereof. I also provide connector bands 536 having slots 538 and 540. The first end of band 536 having slot 538 is adapted to fit over an end pin 441 with slot 538 around cable strand 440. This connector band 536 is installed by removing a roller 444, slipping the band in place, and then placing a new roller 444d in position in the manner as set forth hereinabove. The insides of the flanges 446 will hold the connector band 536 in place. Ball 534 is then installed in slot 540 in the same manner. The inside of the flanges 426 will again maintain pin 530 in its proper position about the band 536.

Where the distance between pins on a particular belt may be greater so that the second end of band 536 comprising slot 540 might not extend between a pair of flanges 446, I may also provide that the outer end 541 of slot 540 be pinched around ball 534 to hold the ball in place. It is to be understood that the link 529 as illustrated in FIG. 33 may be completed by providing another band 536 on the other side of the link on the right hand ball 534 in the same manner as the left hand band 536 just described. Thus, a belt connector means 529 will usually comprise a pair of bands 536 between which are held a pair of balls 534 holding a cable 532 on which may be strung one or more linking pins 530.

I may also provide further forms of universal joints as shown in FIGS. 36 and 37 of the drawings. These forms of invention are similar to and for the same purpose as those set forth in FIGS. 9 through 12 of the drawings, the difference being in the form of transmission belt provided as the component of the joint. In FIG. 36, I show a form of belt 542 which is substanially similar to the belt 438 shown in FIG. 14 except that the rollers 544 have flanges 546 on both sides thereof. I provide a link such as link 482 to install belt 542 as an endless belt around the sprockets 550 to complete the joint. Thus, when power is applied at either axle 552 or 554, it will be transmitted through the joint of FIG. 36 to the opposite axle.

In FIG. 37, I show another form of belt 560 which may be used for a similar purpose. In this belt 560, I provide a two-cable or two-strand belt with cables 562 comprising pins 564, each having two rollers 566 to provide a double series of rollers 566. Each roller 566 has two flanges 568 so as to be guided over sprocket teeth 570 and 572 of a pair of sprockets similar to sprockets 550 shown in FIG. 36. In this form of belt 560, belt connector means such as that illustrated in FIG. 29 comprising links 502, are provided.

FIG. 38 shows a form of dog ear 580 having an opening 582 on which to hang an article having a hook 584. The dog ear 580 may be installed on any adjoining pair of pins such as pins 421 in a manner similar to that of installing the links 502. It is to be understood that any given belt may have pins having end connector means such as the annular grooves 500. Such a belt can be made with all pins having such ends or with selected pins having such ends where it is desired to place connecting links 502 or dog ears 580 or similar accessories. While the annular grooves are specifically set forth as an example herein, any type of connector may be provided for the accessories so long as the connector can be contained relatively simply and efficiently with relation to the flexibility of the belt involved.

In FIGS. 38 and 39, I illustrate another accessory, a platform means 586. Platform means 586 has a pair of platform supports 588 having openings 590 which are fitted on pin ends in the same manner as the links 502 and the dog ears 580. It will be appreciated that a series of platform means 586 distributed longitudinally along a belt will provide a flat continuous platform which will move in the direction of the belt. At a sprocket end of the belt where the belt will move around a sprocket, the platform will split away from one another around the radius of the sprocket and travel back, preferably underneath the upper moving platform, to another sprocket, travel around the radius of the second sprocket to an upper side again to reform the endless moving platform. This is partially illustrated in FIG. 38 of the drawings wherein the arrow shows a direction of movement of a pair of such platforms 586. A plurality of such platforms will form the continuous moving platform described.

Wherefore I claim:

1. A transmission belt adapted for use with sprocket wheel means comprising body portion means including at least one flexible elongated element adapted to move in at least one direction of travel with relation to said sprocket means, said flexible elongated body portion having affixed thereto a series of transmission pins, each comprising at least one axle means together with at least one transmission roller mounted thereon, said roller having a diameter substantially equal to twice the radius of the root of the sprocket teeth of said sprocket wheel means.

2. The transmission belt as defined in claim 1, in which the transmission pins are normally in parallel relationship and transverse to the direction of travel of the said elongated flexible body portion.

3. The transmission belt as defined in claim 1, in which selected transmission rollers comprise at least one flange.

4. The transmission belt as defined in claim 3, in which the said flange is bevelled on a face facing toward the face of the teeth of the sprocket wheel means.

5. The transmission belt as defined in claim 1, in which there are a plurality of flexible elongated elements connected by transmission pins.

6. The transmission belt as defined in claim 1, in which there are a plurality of flexible elongated elements connected by a series of transmission pins carrying rollers mounted between said flexible elongated elements.

7. The transmission belt as defined in claim 6, in which selected rollers comprise at least one flange.

8. The transmission belt as defined in claim 7, in which the said flange is bevelled on a face facing toward the face of the teeth of the sprocket wheel means.

9. The transmission belt as defined in claim 8, in which said selected rollers are comprised in at least one series aligned in said direction of travel, and said bevelled flanges are located on alternate sides of each of said selected rollers.

10. The transmission belt as defined in claim 8, in which said selected rollers are comprised in at least one series aligned in said direction of travel, and said bevelled flanges are located on both sides of said selected rollers.

11. A transmission belt as defined in claim 1, in which there is a single elongated flexible element in the body portion means, and in which the transmission pins are provided with axle means on both sides of said elongated element, with each axle means being provided with at least one roller.

12. The transmission belt as defined in claim 11, in which selected transmission rollers each have at least one flange.

13. The transmission belt as defined in claim 12, in which the said flange is bevelled on a face facing toward the face of the teeth of the sprocket wheel means.

14. The transmission belt as defined in claim 13, in which said selected rollers are comprised in a plurality of series aligned in said direction of travel, and said bevelled flanges are located on succeeding selected rollers in alternate series.

15. The transmission belt as defined in claim 13, in which said selected rollers are comprised in a plurality of series aligned in said direction of travel, and said bevelled flanges are located on selected rollers positioned laterally in each series.

16. The transmission belt as defined in claim 11, in which said transmission pins comprise inner shoulders on axle means and outer shoulders on said axle means, said inner and outer shoulders defining the position of said rollers on said axle means.

17. The transmission belt as defined in claim 16, in which there is a flange on an end of each of said selected rollers defining an end wall for the roller, said end wall being in abutting relationship to said inner shoulder on said transmission pin.

18. The transmission belt as defined in claim 17, in which the roller bore of each of said rollers joins said flange end wall on a chamfer, and there is an inner annular shoulder adjacent the other end of the roller bore of the said roller adapted to abut the outer shoulder of said transmission pin.

19. The transmission belt as defined in claim 18, in which the rollers are made of a deformable material adapted to be deformed for assembly and replacement on said transmission pins.

20. The transmission belt as defined in claim 18 which further comprises a second flange on each selected roller at the end opposite the end of the first mentioned flange.

21. The transmission belt as defined in claim 20, in which the rollers are made of a deformable material adapted to be deformed for assembly and replacement on said transmission pin axles.

22. At least one transmission belt as defined in claim 11 in combination with belt connector means for the ends of one or more of said transmission belts, comprising spring wire having a pair of curled ends curled around end transmission pins respectively of ends of transmission belt means.

23. At least one transmission belt as defined in claim 11 in combination with belt connector means for the ends of one or more of said transmission belts, comprising wire in the form of a figure eight having bights on each end, said bights being curved around end transmission pins respectively of ends of transmission belt means.

24. A transmission belt as defined in claim 23, in which there are connector means comprising eyelet and hook means.

25. The combination as defined in claim 23, in which the figure eight is formed of a braided wire.

26. The combination as defined in claim 25, in which the braided wire figure eight comprises a pressure band connector to complete the figure of the braided wire.

27. At least one transmission belt as defined in claim 11 in combination with belt connector means for the ends of one or more of said transmission belts, comprising an offset link comprising openings adapted to fit around end transmission pins respectively of ends of transmission belt means with a first offset end of said link positioned on a first side of said direction of travel of said flexible elongated member, and a second offset end of said link positioned on an opposite side of said direction of travel of said flexible elongated member.

28. The combination as defined in claim 27, in which the openings are placed on centers to provide a shorter pitch between the end transmission pins connected by said belt connector means than the pitch between other transmission pins in the said transmission belt which are connected by said flexible elongated body portion.

29. At least one transmission belt as defined in claim 11 in combination with belt connector means for the ends of one or more of one or more of said transmission belts, comprising a pair of links made of spring tempered steel having end openings adapted to fit over end transmission pins respectively of ends of transmission belt means, said links being positioned between said rollers, each link comprising a centrally bent portion of reduced center cross section area.

30. The combination as defined in claim 29, in which the openings of each link are on opposite sides of said elongated flexible element and are placed on centers to provide a shorter pitch between the end transmission pins connected by said belt connector means than the pitch between other transmission pins in the said transmission belt which are connected by said flexible elongated body portion.

31. The combination as defined in claim 29, in which said openings comprise an internal edge turned on a radius.

32. The combination as defined in claim 29, in which the openings are provided with plastic eyelets adapted to be positioned between the inner edges of said openings and the said pins.

33. At least one transmission belt as defined in claim 11 in combination with belt connector means for the ends of one or more of said transmission belts, comprising at least one connector band adapted to be placed around end transmission pins respectively of ends of transmission belt means, said connector band comprising slot means adapted to retain ball end means of a linking cable, said linking cable comprising at least one transmission pin means substantially similar to the transmission pin means of the said transmission belt.

34. The combination as defined in claim 33, in which said linking cable has ball end means at each end thereof connected to connector band means which in turn are connected to the respective belt ends.

35. The combination as defined in claim 34, in which a first end of a connector band is positioned between ends of the rollers on an end transmission pin of a said end of a transmission belt means, and a second end of said connector band is positioned between rollers of a transmission pin means on said linking cable.

36. The combination as defined in claim 35, in which the ends of the rollers between which the connector bands are positioned are flange ends.

37. The combination as defined in claim 34, in which the first end of a connector band is positioned between ends of the rollers on an end transmission pin of a said end of a transmission belt means, and a second end of said connector band is provided with said slot means adapted to retain said ball end means, said slot means being pinched around said ball means.

38. A transmission belt as defined in claim 1, in which the transmission pins are affixed to the elongated member by flow material binding means.

39. A transmission belt as defined in claim 38, in which the said flow material binding means comprises a portion of the material of the transmission pin flowed against at least a portion of the elongated member.

40. The transmission belt as defined in claim 39, in which the elongated member is standard braided flexible cable.

41. The transmission belt as defined in claim 39, in which the elongated member is comprised of cord.

42. The transmission belt as defined in claim 39, in which the transmission pin is made of plastic material.

43. The transmission belt as defined in claim 42, in which the roller is made of plastic.

44. The transmission belt as defined in claim 42, in which the roller is made of a metal.

45. The transmission belt as defined in claim 39, in which the transmission pin is made of metal.

46. The transmission belt as defined in claim 45, in which the roller is made of plastic.

47. The transmission belt as defined in claim 45, in which the roller is made of a metal.

References Cited

UNITED STATES PATENTS

| | | |
|---|---|---|
| 580,449 | 4/1897 | Caldwell. |
| 2,223,906 | 12/1940 | Bishop _____________ 74—235 |
| 2,864,263 | 12/1958 | Rawson _____________ 74—235 |
| 3,091,030 | 5/1963 | Zumbrunnen _________ 74—231 |

FRED C. MATTERN, Jr., Primary Examiner

JAMES A. WONG, Assistant Examiner

U.S. Cl. X.R.

74—245